United States Patent [19]

von der Crone et al.

[11] Patent Number: 4,764,217
[45] Date of Patent: Aug. 16, 1988

[54] NOVEL COMPOSITIONS BASED ON ISOINDOLINE PIGMENTS

[75] Inventors: Jost von der Crone, Arconciel; Bernhard Medinger, Giffers; Philippe Bugnon, Essert, all of Switzerland

[73] Assignee: Ciba-Geigy Corporation, Ardsley, N.Y.

[21] Appl. No.: 129,577

[22] Filed: Dec. 7, 1987

[30] Foreign Application Priority Data

Dec. 17, 1986 [CH] Switzerland ............... 5055/86

[51] Int. Cl.$^4$ .................. C09B 57/04; C07D 209/44
[52] U.S. Cl. .................................. 106/494; 548/471;
548/482; 548/462; 548/476; 548/305; 548/300;
546/157; 546/153; 546/151; 546/347; 546/208;
546/182; 544/105; 544/284; 544/300; 544/144;
544/410; 544/373
[58] Field of Search .................. 106/288 Q; 548/482,
548/462, 476, 305, 471, 300; 544/105, 284, 300,
373, 410, 144; 546/182, 208, 347, 151, 157, 153

[56] References Cited

U.S. PATENT DOCUMENTS 4,262,120  4/1981  von der Crone .
4,384,057  5/1983  von der Crone .
4,426,533  1/1984  Rochat et al. .
4,599,113  7/1986  Lotsch et al. ............... 106/288 Q

OTHER PUBLICATIONS

*Chemical Abstracts*, Registry Number 5507-24-4.
*Chemical Abstracts*, vol. 101, No. 19, Abstract No. 170559k, Spiessens, L. I.; Anteunis, M. J., "NMR Studies on Imidines", 1984.

*Primary Examiner*—A. Lionel Clingman
*Assistant Examiner*—Christine Skane
*Attorney, Agent, or Firm*—Luther A. R. Hall

[57] ABSTRACT

Composition containing
(a) an isoindoline pigment of the formula I

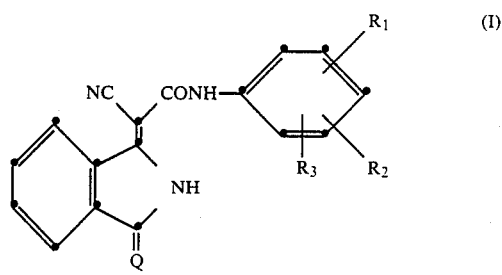

and
(b) a compound of the formula II

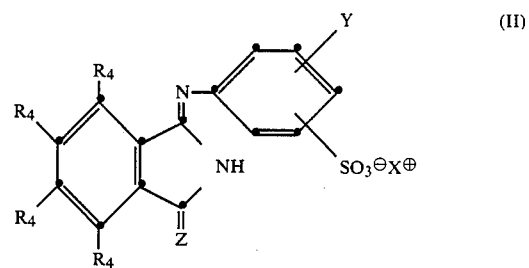

Pigment mixtures of this kind, in particular when used in paints, are distinguished in particular by increased tinctorial strength and high lustre and especially by improved rheology.

For the definition of the substituents and symbols $R_1$, $R_2$, $R_3$, $R_4$, Q, X, Y and Z, see claim 1.

9 Claims, No Drawings

NOVEL COMPOSITIONS BASED ON ISOINDOLINE PIGMENTS

The invention relates to compositions containing an isoindoline pigment and a sulfonated isoindoline compound, and to the use thereof for colouring high molecular weight organic material.

Isoindoline pigments, which have long been used for colouring high molecular weight organic material (cf. for example DE-A-No. 2,814,526, EP-A-No. 19,588, EP-A-No. 62,614), do not always meet the requirements of modern industry, in particular in respect of their rheological properties.

It has now been found that by adding certain sulfonated isoindoline compounds to isoindoline pigments the rheological behaviour of the latter is very surprisingly improved.

The present invention accordingly provides a composition containing (a) an isoindoline pigment of the formula I

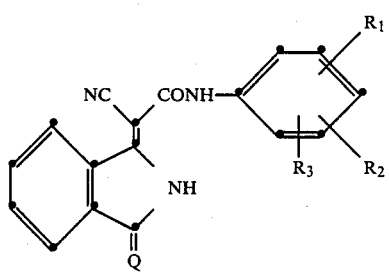

in which $R_1$ is hydrogen, halogen, methyl, $C_1$–$C_4$-carbamoyl, $C_1$–$C_4$-alkanoylamine, unsubstituted or halogen-, methylmethoxy-, trifluoromethyl- or acetylamino-ringsubstituted benzoylamino or phenylcarbamoyl or unsubstituted or chlorine-substituted phthalimide, $R_2$ and $R_3$ are independently of each other hydrogen, halogen, $C_1$–$C_4$-alkyl or $C_1$–$C_4$-alkoxy, or $R_1$ and $R_2$, together with the phenyl radical to which they are bonded, form a benzimidazolone, quinazolone, dihydroxyquinazoline, phenmorpholone, quinolone or 4-methylquinolone radical, and Q is a group of the formula

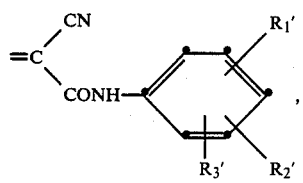

in which $R_1'$, $R_2'$ and $R_3'$ are defined in the same way as $R_1$, $R_2$ and $R_3$ above, or is a group of the formula

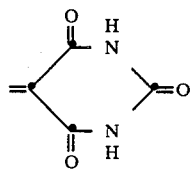

and (b) a compound of the formula II

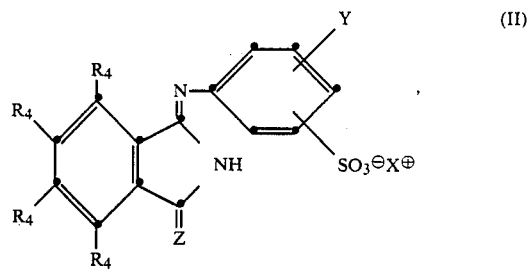

in which $R_4$ is hydrogen or chlorine, $X^\oplus$ is $H^\oplus$ or a group of the formulae

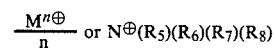

$M^{n\oplus}$ is an n-valent metal cation, n is 1, 2 or 3, $R_5$, $R_6$, $R_7$ and $R_8$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_7$ and $R_8$, together with the N atom form a pyrrolidine, imidazolidine, piperidine, piperazine or morpholine radical, or $R_6$, $R_7$ and $R_8$, together with the N atom, form a pyrrole, pyridine, picoline, pyrazine, quinoline or isoquinoline radical, Y is hydrogen, halogen, methyl or amino and Z is one of the groups of the formulae

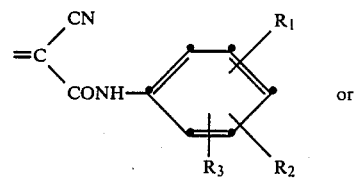

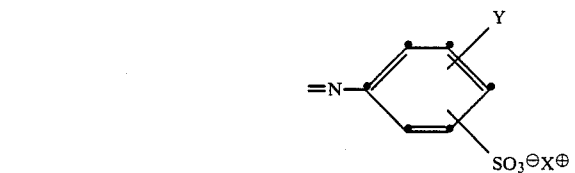

in which $R_1$, $R_2$, $R_3$, $X^\oplus$ and Y are as defined above or Z, if $R_4$ is chlorine, is oxygen.

A halogen substituent is for example fluorine, preferably bromine and in particular chlorine.

A $C_1$–$C_4$-carbamoyl $R_1$ is for example aminocarbonyl, methylcarbamoyl, ethylcarbamoyl, propylcarbamoyl or isopropylcarbamoyl. Preference is given to aminocarbonyl.

A $C_1$–$C_4$-alkanoylamino $R_1$ is for example formylamino, acetylamino, propionylamino, n-butyrylamino or isobutyrylamino. Preference is given to acetylamino.

A $C_1$–$C_4$-alkyl $R_2$ or $R_3$ is for example methyl, ethyl, n-propyl, isopropyl, n-butyl, sec.-butyl or tert.-butyl. Preference is given to methyl.

A $C_1$–$C_4$-alkoxy $R_2$ and $R_3$ is for example methoxy, ethoxy, n-propoxy, n-butoxy or sec.-butoxy. Preference is given to methoxy.

A heterocyclic radical of the type defined as composed of $R_2$, $R_3$, $R_2'$ and $R_3'$ together with the phenyl radical to which they are bonded is for example benzimidazolon-5-yl, 6-chlorobenzimidazolon-5-yl, 6-methylbenzimidazolon-5-yl, quinazol-4-on-6-yl, 2- methylquinazol-4-on-6-yl, quinazol-4-on-7-yl, 2,4-dihydroxy-quinazolin-6-yl, phenmorphol-3-on-7-yl, phenmorphol-3-on-6-yl, 6-methylphenmorphol-3-on-7-yl, quinol-2-on-6-yl, 4-methylquinol-2-on-7-yl, 7-chloro-4-methylquinol-2-on-6-yl or 4,8-dimethylquinol-2-on-7-yl.

Q and Z are preferably a group of the formula

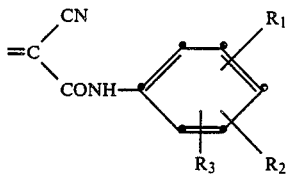

$R_1$ is preferably hydrogen.

$R_2$ is preferably bonded in the 4-position and preferably is hydrogen or chlorine.

$R_3$ is preferably bonded in the 3-position and preferably is hydrogen or chlorine.

$X^\oplus$ is preferably $H^\oplus$ or in particular a group of the formula $M^{n\oplus}/n$.

In a group $X^\oplus$ of the formula $M^{n\oplus}/n$, $M^{n\oplus}$ is for example an alkali metal, alkaline earth metal, aluminium or transition metal cation, for example $Na^\oplus$, $K^\oplus$, $Mg^{2\oplus}$, $Ca^{2\oplus}$, $Sr^{2\oplus}$, $Ba^{2\oplus}$, $Mn^{2\oplus}$, $Cu^{2\oplus}$, $Ni^{2\oplus}$, $Cd^{2\oplus}$, $Co^{3\oplus}$, $Al^{3\oplus}$ and $Cr^{3\oplus}$, but in particular an alkali metal or alkaline earth metal cation (n=1 or 2) and preferably $Ca^{2\oplus}$.

A $C_1-C_{18}$-alkyl substituent is for example methyl, ethyl, n-propyl, isopropyl, n-butyl, sec.-butyl, tert.-butyl, n-pentyl, tert.-pentyl, hexyl, heptyl, octyl, decyl, dodecyl, tetradecyl, hexadecyl, heptadecyl or octadecyl.

A $C_5-C_6$-cycloalkyl $R_5$, $R_6$, $R_7$ and $R_8$ is for example cyclopentyl or in particular cyclohexyl.

A $C_1-C_{18}$-alkyl-substituted phenyl $R_5$, $R_6$, $R_7$ and $R_8$ is preferably $C_{12}-C_{18}$-alkyl-substituted phenyl.

Specific examples of $N^\oplus(R_5)(R_6)(R_7)(R_8)$ are: $N^\oplus H_4$, $N^\oplus H_3CH_3$, $N^\oplus H_2(CH_3)_2$, $N^\oplus H_3C_2H_5$, $N^\oplus H_2(C_2H_5)_2$, $N^\oplus H_3C_3H_7$-iso, $N^\oplus H_3$-cyclohexyl, $N^\oplus H_2$-(cyclohexyl)$_2$, $N^\oplus H_2(CH_3)(C_6H_5)$, $N^\oplus H_3C_6H_5$ $N^\oplus H_3$-p-octadecylphenyl and $N^\oplus(CH_3)_4$.

Of particular interest are compositions containing (a) an isoindoline pigment of the formula III

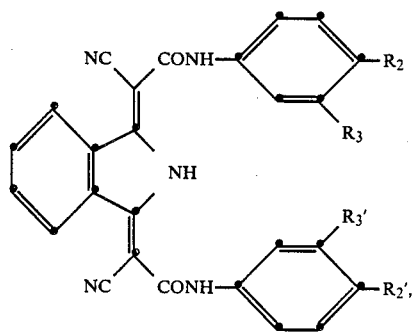

(III)

in which $R_2$, $R_3$, $R_2'$ and $R_3'$ are independently of each other hydrogen or chlorine and (b) a compound of the formula IV

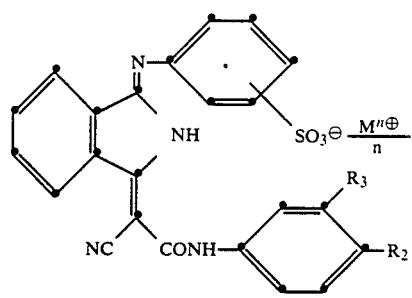

(IV)

in which $R_2$ and $R_3$ are as defined above, $M^{n\oplus}$ is an n-valent metal cation and n is 1, 2 or 3.

Of very particular interest are compositions containing (a) an isoindoline pigment of the formula III as defined above and (b) a compound of the formula IV in which $R_2$ and $R_3$ are as defined above and $M^{n\oplus}$ is an alkali metal or alkaline earth metal cation (n=1 or 2), but in particular $Ca^{2\oplus}$.

The isoindoline pigments of the formula I are known and can be prepared by known methods.

The compounds of the formula II are novel and comprise a further part of the subject-matter of the invention.

Compounds of the formula II in which Z is a group of the formula

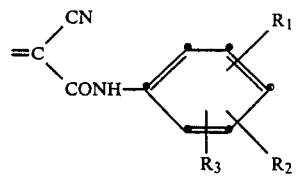

are obtained analogously to processes known per se, for example by condensation of an iminoisoindoline of the formula

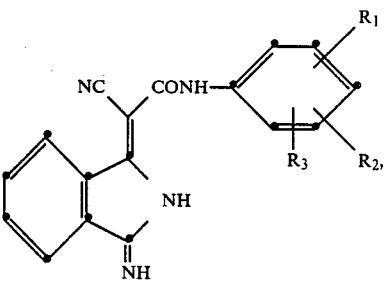

in which $R_1$, $R_2$ and $R_3$ are as defined above, with an amine of the formula V

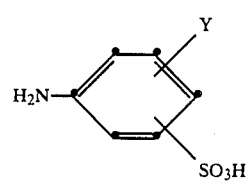

(V)

in which Y is as defined above, in a molar ratio of 1:1, in acid solution, for example in glacial acetic acid, and if desired by subsequent reaction with a salt $X^{\oplus}L^{\ominus}$ in which $X^{\oplus}$ is one of the groups $M^{n\oplus}/n$ or $N^{\oplus}(R_5)(R_6)(R_7)(R_8)$ as defined above and $L^{\ominus}$ is for example a hydroxyl, chloride, acetate or nitrate ion, likewise in a molar ratio of 1:1.

Compounds of the formula II in which Z is a group of the formula

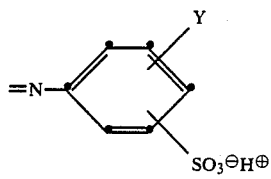

are obtained analogously to processes known per se, for example by condensation of a diiminoisoindoline of the formula

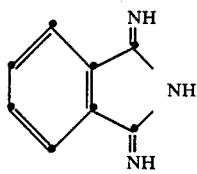

with an amine of the formula V in a molar ratio of 1:2 in acid solution, for example in glacial acetic acid, and if desired by subsequent reaction with a salt $X^{\oplus}L^{\ominus}$.

Compounds of the formula I in which $R_4$ is chlorine and Z is oxygen are obtained analogously to processes known per se, for example by condensation of lower alkyl, preferably methyl, 3,4,5,6-tetrachloro-2-cyanobenzoate with an amine of the formula V in a molar ratio of 1:1 in the absence of water in a polar organic solvent, preferably methanol, ethanol or isopropanol, and in the presence of a base, for example sodium methylate or sodium ethylate, and if desired by subsequent reaction with a salt $X^{\oplus}L^{\ominus}$.

To prepare the compositions according to the invention, advantageously component (a) is first conditioned in a conventional manner and suspended in water. Component (b) is in general added in the form of a free sulfonic acid, and the salt $X^{\oplus}L^{\ominus}$ is added to obtain precipitation. It is also possible to mix component (b) directly in salt form in aqueous suspension with component (a).

The mixing ratios of the components of the compositions according to the invention can vary within wide limits. Preferred mixing ratios, however, range from 1 to 10% by weight of component (b): 99 to 90% by weight of component (a), but in particular from 2 to 8% by weight of component (b): 98 to 92% by weight of component (a) and preferably from 4 to 6% by weight of component (b): 96 to 94% by weight of component (a).

The addition of component (b) can take place, before or after the conditioning of the pigment (component a). Conditioning is to be understood as meaning the preparation of a fine particle form, for example by alkaline precipitation, sulfuric acid precipitation, dry milling with or without salt, solvent or aqueous milling and preferably salt kneading.

Depending on the conditioning method or intended application, it can be of advantage to add to the pigment not only the amount of component (b) required according to the invention but also certain amounts of texture-improving agents before or after the conditioning process. These comprise in particular fatty acids having at least 18 C atoms, for example stearic or behenic acid or their amides or metal salts, in particular Mg salts, and also plasticizers, waxes, resin acids, such as abietic acid, rosin soap, alkylphenols or aliphatic alcohols, such as stearyl alcohol or vicinal diols, such as dodecane-1,2-diol, and also modified rosin maleate resins or fumaric acid rosin resins. The texture-improving agents are preferably added in amounts of 0.1–30% by weight, in particular 2–15% by weight, based on the end product.

The compositions according to the invention are suitable for use as pigments for colouring high molecular weight organic material.

High molecular weight organic materials which can be coloured or pigmented with the compositions according to the invention are for example cellulose ethers and esters, such as ethylcellulose, nitrocellulose, cellulose acetate or cellulose butyrate, natural resins or synthetic resins, such as polymerization resins or condensation resins, such as amino resins, in particular urea- and melamine-formaldehyde resins, alkyd resins, phenolic resins, polycarbonates, polyolefins, polystyrene, polyvinyl chloride, polyamides, polyurethanes, polyesters, rubber, casein, silicone and silicone resins, individually or mixed.

High molecular weight organic materials in dissolved form for use as film formers also come into consideration, for example linseed oil varnish, nitrocellulose, alkyd resins, phenolic resins, melamine resins, acrylic resins and urea-formaldehyde resins.

The high molecular weight organic compounds mentioned can be present individually or mixed as plastic compositions, melts or in the form of spinnable solutions, surface coatings, paints or printing inks. Depending on the intended use, it has proven advantageous to use the compositions according to the invention as toners or in the form of formulations. Based on the high molecular weight organic material to be pigmented, the compositions according to the invention can be used in an amount of 0.01 to 30% by weight, preferably 0.1 to 10% by weight.

The pigmenting of the high molecular weight organic substances with the compositions according to the invention is effected for example by mixing such a composition, if desired in the form of a masterbatch, into these substrates using roll mills or mixing or milling apparatus. The pigmented material is then brought into the desired final form by methods known per se, such as calendering, pressing, extruding, coating, casting or injection moulding. Frequently it is desirable, if the mouldings to be produced are not to be rigid or to reduce their brittleness, to incorporate so-called plasticizers in the high molecular weight compounds before moulding. These plasticizers can be for example esters of phosphoric acid, phthalic acid or sebacic acid. Plasticizers can be incorporated into the polymers before or after incorporation of the compositions according to the invention. It is also possible, if different hues are to be obtained, to add to the high molecular weight organic materials not only the compositions according to the invention but also fillers and other colouring constituents, such as white, coloured or black pigments, in any desired amount.

For pigmenting of paints and printing inks, the high molecular weight organic materials and the compositions according to the invention, if desired together with additives, such as fillers, other pigments, siccatives or plasticizers, are finely dispersed or dissolved in a common organic solvent or solvent mixture. This can be done by dispersing or dissolving the individual components by themselves or, alternatively, several of them together, and only then combining all the components.

The colorings obtained, for example in plastics, fibres, paints or prints, are distinguished by good general properties, such as good dispersibility, high transparency, good over-lacquering, migration, heat, light and weather resistance, and the colored plastics exhibit absence of distortion.

In addition, the compositions according to the invention, compared with unmodified isoindoline pigments, have improved tinctorial strength and in particular in paints and printing inks improved rheology, lower separation effects, such as floating in the presence of white pigments, a lower flocculation tendency and, in surface coatings, a higher lustre.

As a consequence of the good rheological properties of the pigment mixtures according to the invention it is possible to produce paints having high pigment loadings.

The compositions according to the invention are preferably suitable for coloring aqueous and/or solvent-containing paints, in particular automotive paints. Their use is very particularly preferred for metallic effect coatings.

The examples which follow serve to illustrate the invention.

EXAMPLE 1

3.23 g of 1-(cyano-p-chlorophenylcarbamoylmethylene)-3-iminoisoindoline and 1.73 g of metanilic acid are refluxed for 2 hours in 50 ml of glacial acetic acid. The resulting yellow reaction product is filtered off at 80° C. and washed with methanol and water to give, after drying, 3.1 g of the dye of the formula

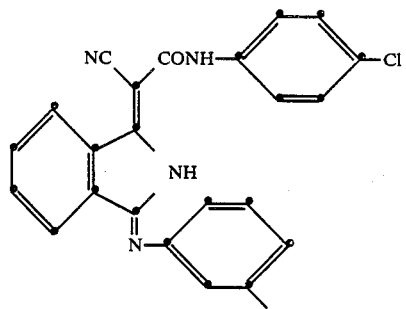

| Analysis for $C_{23}H_{18}N_5O_4ClS$ | | | | |
|---|---|---|---|---|
| | C | H | N | S | Cl |
| calculated: | 55.7% | 3.63% | 14.12% | 6.46% | 7.16% |
| found: | 56.0% | 3.69% | 13.82% | 5.68% | 7.57% |

EXAMPLE 2

6.0 g of methyl 3,4,5,6-tetrachloro-2-cyanobenzoate are added to a solution of 40 ml of methanol and 1.08 g of sodium methylate. The mixture is stirred for half an hour. A solution of 3.46 g of metanilic acid, 1.08 g of sodium methylate and 30 ml of methanol is then added and stirred in at room temperature for 15 hours. This is followed, while stirring, by refluxing for 3 hours, acidifying with 2.5 ml of acetic acid and a further 2 hours under reflux. The reaction product is filtered off at room temperature, washed with a little methanol and dried to give 7.0 g of a yellow dye of the formula

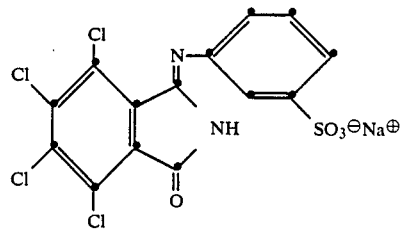

| Analysis for $C_{14}H_5Cl_4N_2O_4SNa$ | | | |
|---|---|---|---|
| | C | H | N | S |
| calculated: | 36.36% | 1.08% | 6.06% | 6.93% |
| found: | 35.55% | 1.61% | 5.83% | 6.98% |

EXAMPLE 3

6.0 g of methyl 3,4,5,6-tetrachloro-2-cyanobenzoate are reacted with 1.08 g of sodium methylate in 40 ml of methanol as described in Example 2. To the solution obtained are added 1.9 g of 1,4-phenylenediamine-2-sulfonic acid, 0.54 g of sodium methylate and 30 ml of methanol. The result is an orange-brown solution which is stirred at room temperature for 3 hours. This is followed, while stirring, by refluxing for 3 hours, acidifying with 2.5 ml of acetic acid and a further 2 hours under reflux. The precipitated reaction product is filtered off hot, washed with a little methanol and dried to give 4.1 g of a yellow dye of the formula

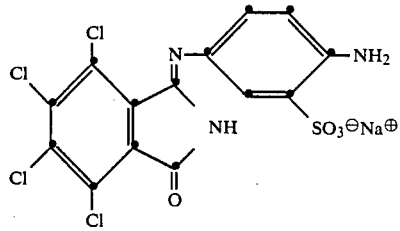

| Analysis for $C_{14}H_6Cl_4N_3O_4SNa$ | | | | |
|---|---|---|---|---|
| | C | H | N | S | Cl |
| calculated: | 35.25% | 1.27% | 8.81% | 6.72% | 29.72% |
| found: | 35.07% | 1.99% | 8.33% | 6.2% | 28.5% |

EXAMPLE 4

9.1 g of 1,3-diiminoisoindoline (80% pure) and 17.3 g of metanilic acid are stirred in 175 ml of glacial acetic acid at room temperature for 3 hours and at the reflux temperature for a further hour. The resulting yellow dye is filtered off hot, washed with glacial acetic acid and acetone and dried to give 21.2 g of the ammonium salt of the dye of the formula

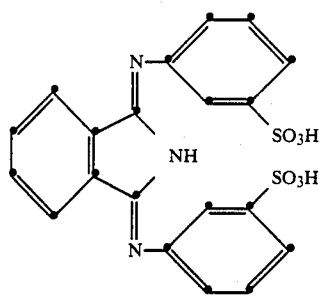

| Analysis for $C_{20}H_{15}N_3O_6S_2 \times NH_3 \times H_2O$ | | | | |
|---|---|---|---|---|
| | C | H | N | S |
| calculated: | 48.78% | 4.06% | 11.38% | 13.0% |
| found: | 49.1% | 4.43% | 10.87% | 13.19% |

EXAMPLE 5

(a) A mixture of 12.8 g of phthalonitrile, 19.45 g of cyanoacet-4-chloroanilide, 27.5 g of cyanoacet-3,4-dichloroanilide, 13.82 g of ground potassium carbonate and 0.8 g of tricaprylmethylammonium chloride in 300 ml of methanol is heated to 100° C. in the course of 6 hours. The suspension is stirred at 100° C. for 1 hour, then cooled down to 70° C. and slowly added in the course of 10 minutes to a warm mixture of 8.4 ml of acetic acid and 200 ml of methanol at 40° C. After 15 hours of boiling under reflux, the pigment obtained is filtered off, washed with 600 ml of warm methanol and with 250 ml of warm water and dried to give 52.1 g of an orange mixture chiefly comprising the pigment of the formula

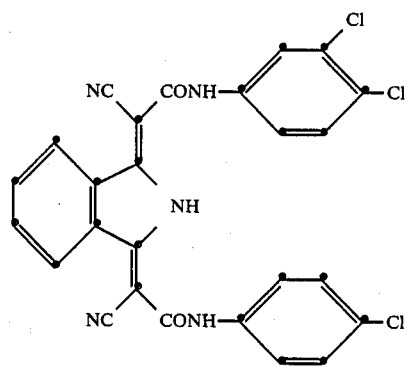

(b) 16.2 g of the moist press cake obtained as per (a) (30.9% dry content) are thoroughly dispersed in 100 ml of water and heated to 70° C. 0.25 g of the compound of Example 1 is then added. After half an hour of stirring at 70° C., 1.32 g of $CaCl_2 \times 2H_2O$ are added, and after a further half hour stirring the product is filtered off at 70° C. and dried to give 5.15 g of an orange pigment mixture.

Incorporating the mixed pigment thus obtained in an alkyd paint system (®Setal 84, Kunstharzfabriek Synthesis B.V., Holland; solids content: 70% by weight) gives strong orange surface coatings of high lustre and good allround resistances.

EXAMPLE 6

Example 5 b is repeated, except that the compound of Example 1 is replaced by the compound of Example 2, affording an orange mixed pigment having equally good properties as that of Example 5b.

EXAMPLE 7

Example 5b is repeated, except that the compound of Example 1 is replaced by the compound of Example 3, affording an orange mixed pigment having equally good properties as that of Example 5b.

EXAMPLE 8

Example 5b is repeated, except that the compound of Example 1 is replaced by the compound of Example 4, affording an orange mixed pigment having equally good properties as that of Example 5b.

What is claimed is:
1. A composition containing
(a) an isoindoline pigment of the formula I

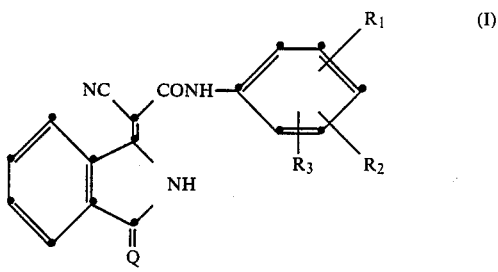

in which $R_1$ is hydrogen, halogen, methyl, $C_1$–$C_4$-carbamoyl, $C_1$–$C_4$-alkanoylamino, unsubstituted or halogen-, methylmethoxy-, trifluoromethyl- or acetylamino-ringsubstituted benzoylamino or phenylcarbamoyl or unsubstituted or chlorine-substituted phthalimide, $R_2$ and $R_3$ are independently of each other hydrogen, halogen, $C_1$–$C_4$-alkyl or $C_1$–$C_4$-alkoxy, or $R_1$ and $R_2$, together with the phenyl radical to which they are bonded, form a benzimidazolone, quinazolone, dihydroxyquinazoline, phenmorpholone, quinolone or 4-methyl-quinolone radical, and Q is a group of the formula

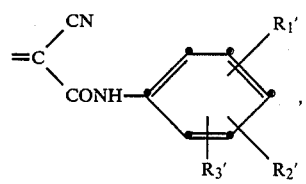

in which $R_1'$, $R_2'$ and $R_3'$ are defined in the same way as $R_1$, $R_2$ and $R_3$ above, or is a group of the formula

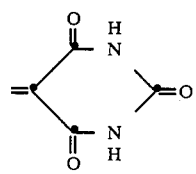

and (b) a compound of the formula II

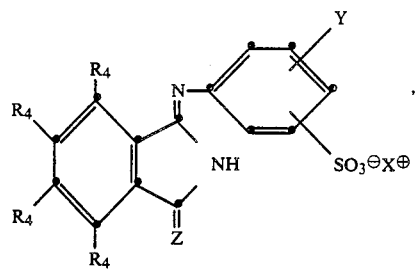

in which $R_4$ is hydrogen or chlorine, $X^\oplus$ is $H^\ominus$ or a group of the formulae

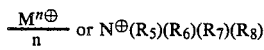

$M^{n\oplus}$ is an n-valent metal cation, n is 1, 2 or 3, $R_5$, $R_6$, $R_7$ and $R_8$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_7$ and $R_8$, together with the N atom form a pyrrolidine, imidazolidine, piperidine, piperazine or morpholine radical, or $R_6$, $R_7$ and $R_8$, together with the N atom, form a pyrrole, pyridine, picoline, pyrazine, quinoline or isoquinoline radical, Y is hydrogen, halogen, methyl or amino and Z is one of the groups of the formulae

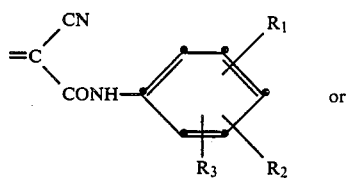

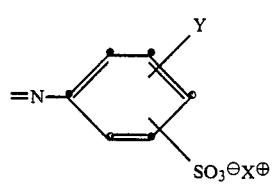

in which $R_1$, $R_2$, $R_3$, $X^\oplus$ and Y are as defined above or Z, if $R_4$ is chlorine, is oxygen.

2. A composition according to claim 1, which contains (a) an isoindoline pigment of the formula III

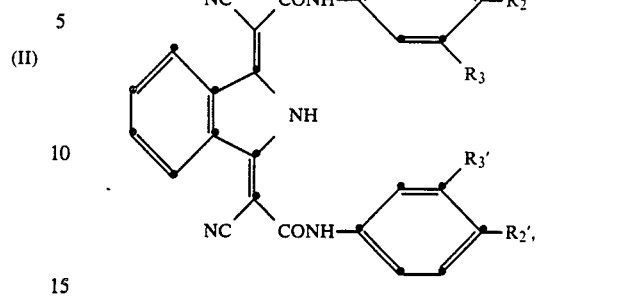

in which $R_2$, $R_3$, $R_2'$ and $R_3'$ are independently of each other hydrogen or chlorine and (b) a compound of the formula IV

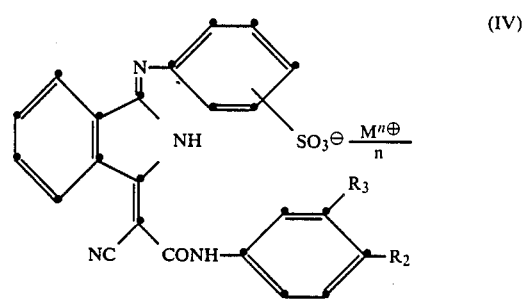

in which $R_2$ and $R_3$ are as defined above, $M^{n\oplus}$ is an n-valent metal cation and n is 1, 2 or 3.

3. A composition according to claim 2, which contains (a) an isoindoline pigment of the formula III as defined in claim 2 and (b) a compound of the formula IV in which $R_2$ and $R_3$ are as defined in claim 2, $M^{n\oplus}$ is an alkali metal or alkaline earth metal cation and n is 1 or 2.

4. A composition according to claim 2, which contains (a) an isoindoline pigment of the formula III as defined in claim 2 and (b) a compound of the formula IV in which $R_2$ and $R_3$ are as defined in claim 2 and $M^{n\oplus}$ is a calcium cation.

5. A composition according to claim 1, wherein the mixing ratio of component (a):component (b) is 99 to 90% by weight: 1 to 10% by weight.

6. A compound of the formula II

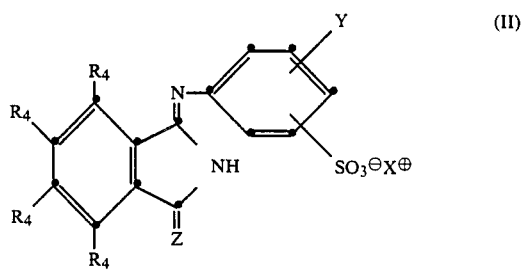

in which $R_4$ is hydrogen or chlorine, $X^\oplus$ is $H^\oplus$ or a group of the formulae $$\frac{M^{n\oplus}}{n} \text{ or } N^{\oplus}(R_5)(R_6)(R_7)(R_8)$$

$M^{n\oplus}$ is an n-valent metal cation, n is 1, 2 or 3, $R_5$, $R_6$, $R_7$ and $R_8$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_7$ and $R_8$, together with the N atom form a pyrrolidine, imidazolidine, piperidine, piperazine or morpholine radical, or $R_6$, $R_7$ and $R_8$, together with the N atom, form a pyrrole, pyridine, picoline, pyrazine, quinoline or isoquinoline radical, Y is hydrogen, halogen, methyl or amino and Z is one of the groups of the formulae

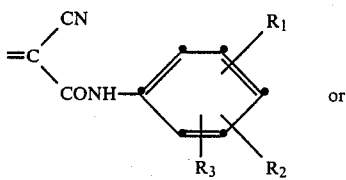 or

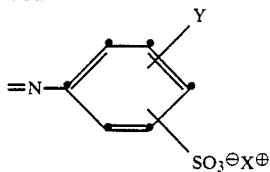

in which $R_1$, $R_2$, $R_3$, $X^{\oplus}$ and Y are as defined above or Z, if $R_4$ is chlorine, is oxygen.

7. A compound according to claim 6, of the formula IV

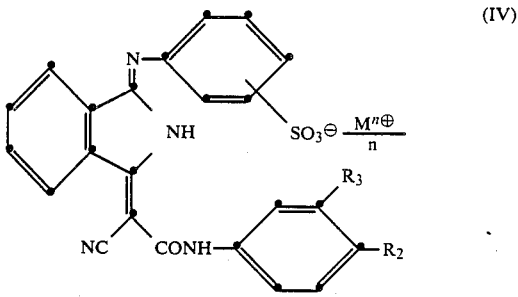

in which $R_2$ and $R_3$ are independently of each other hydrogen or chlorine, $M^{n\oplus}$ is an n-valent metal cation and n is 1, 2 or 3.

8. A compound according to claim 7, wherein $M^{n\oplus}$ is an alkali metal or alkaline earth metal cation and n is 1 or 2.

9. A compound according to claim 7, wherein $M^{n\oplus}$ is a calcium cation.

* * * * *